Patented Aug. 16, 1927.

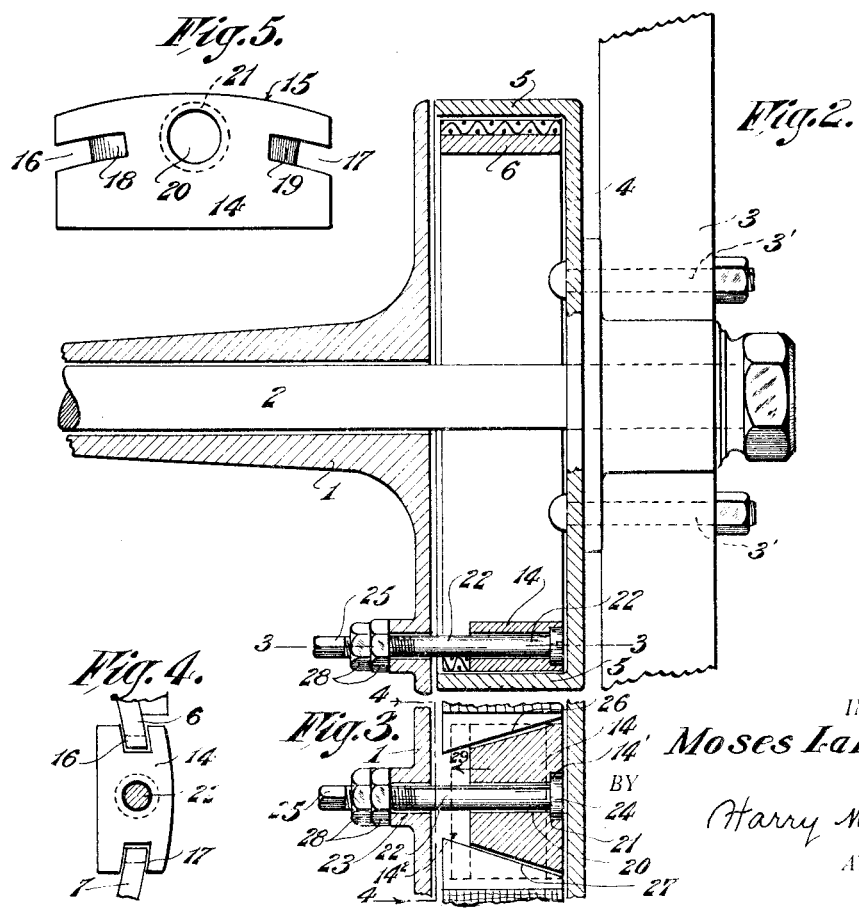

1,639,379

UNITED STATES PATENT OFFICE.

MOSES LA LONDE, OF SPRINGFIELD, MASSACHUSETTS, ASSIGNOR TO WALTER B. RUSSELL, OF SPRINGFIELD, MASSACHUSETTS.

BRAKE-ADJUSTING DEVICE.

Application filed December 10, 1926. Serial No. 153,849.

This invention relates to improvements in adjusting mechanism for motor vehicle brakes, and, more particularly for adjusting the internal brake bands from the outside of the axle housing or casing member.

Heretofore it has been a common practice when the linings of the internal brake have become worn, necessitating adjustment, that the rear wheels must be removed.

The present invention is therefore designed to overcome this objection and to permit accurately adjusting these brake bands from the exterior or outside of the axle housing. It also permits the new bands to be installed when the lining is entirely or nearly worn out.

In general, the present invention comprises a threaded member which is located in the usual threaded openings of the external or axle housing. A grooved block is attached to the inner end of this threaded member which is formed with oppositely disposed inclined surfaces in the bottoms of the grooves. The adjacent ends of the brake bands are also beveled, or inclined for engaging the inclined grooved surfaces of the block which grooves are located in the opposite ends of the block. This block is located substantially opposite the devices for operating the brake bands when the brakes are to be applied, which devices comprise upturned end portions of the brake bands that are spaced apart a suitable distance and located in this space is an operating cam which is substantially elliptical.

In operation, when the brake linings become worn so that the brakes are not properly applied, the threaded member which passes through the threaded opening in the axle housing is operated by applying a wrench or other tool, to its outer squared end. This operation moves the block inward causing the inclined cooperating surfaces of the grooved block and the inclined ends of the brake bands to engage, thus forcing the brake bands outward toward the inner surface of the brake drum, or in other words increasing their diameter. After the requisite adjusting is made, a lock nut is turned onto the threaded member for retaining the brake bands and their adjusting block in their adjusted positions, thus permitting the brakes to operate properly.

The adjusting block comprises a member which is formed with oppositely disposed inclined surfaces that are located at the bottom or inner ends of grooves. This block is formed with an opening to receive the threaded member which passes through the threaded opening of the casing.

Referring to the drawings:—

Fig. 1 is a plan view showing the two internal brake bands with their linings attached thereto, the adjusting block which is located between their adjacent ends and the cam for applying the brakes.

Fig. 2 is a partial sectional view on the line 2—2 of Fig. 1 showing a portion of the axle, the housing, or casing for the same, and a portion of the wheel attached to the axle, also the threaded member or bolt for operating the brake band adjusting block and the lock nut for the same.

Fig. 3 is is a detail sectional view on the section line 3—3 of Fig. 2 showing the threaded member or block adjusting bolt and showing the inclined surfaces with which the inclined ends of the brake bands engage.

Fig. 4 is a detail sectional view on the line 4—4 of Fig. 3 looking in the direction of the arrows, and Fig. 5 is a detail plan view of the grooved block for adjusting the brake bands.

Referring to the drawings in detail:

1 designates the axle housing; 2 one of the axle members; 3 a portion of the wheel part to which the axle 2 is secured; 4 the brake drum that is attached to the wheel 3 by means of the bolts 3' and having the brake engaging flange 5. 6 and 7 designate the two internal brake bands to which is secured the brake linings 8 by means of the rivets 8'. 9 designates a cam member for operating the brake bands when the brakes are to be applied; this member is located between the usual offset portions 10. 11 designates the usual spring for normally drawing these portions against the cam 9. 12 is the operating brake rod which is connected to the cam 9 by the arm 13.

Referring now more particularly to the present invention, 14 designates a block which is formed with an outer curved surface 15 that is slightly less in radius than the brake bands in order not to contact with the inner surface of the brake flange 5. This block is formed with the oppositely located grooved or cut out portions 16 and 17.

The inner or bottom portions of the grooves are formed with inclined surfaces as indicated at 18 and 19. It is formed with an opening 20 and a recessed part 21. 22 designates a threaded member which is located in the opening 20 of the block 14, the threads of which engage the threaded opening 23 of the casing 1. The threaded member 22 is formed with a head portion 24 which enters the recess 21. The outer end of the threaded member 22 is formed with flat or square surfaces 25 for receiving an operating tool as a wrench. The ends of the brake bands 6 and 7 are each formed with an inclined surface that coincides with the angle of inclination of the surfaces 18 and 19 of the brake band adjusting block 14. These inclined surfaces are designated by the reference numerals 26 and 27. 28 are lock nuts on the threaded member 22 by means of which the block 14 and the brake bands 6 and 7 may be retained in their adjusted positions.

The operation of the device may be described as follows: The position of the parts when installed are those shown in Figs. 1, 2, and 3 with the upper edge 14' of the block 14 substantially flush or in the same plane as the upper edge of the brake bands. When the lining 8 becomes worn so that the brakes do not hold sufficiently the operator applies a wrench or other tool to the squared end 25 of the threaded member 22 after first loosening the lock nuts. The threaded member 22 is then rotated in the threaded opening 23 of the casing 1. This causes the band adjusting member 14 to be moved downward in the direction of the arrow 29, whereby the inclined surfaces 18 and 19 of the member 14 will engage the inclined surfaces 26 and 27 of the brake bands, thus forcing the bands outward as indicated by the arrows 30 in Fig. 1, or, in other words, increasing the diameter of the bands whereby the linings 8 are brought nearer to the inner surface of the flange 5 of the brake drum 4. The block 14 would then assume the dotted line position 14², (see Fig. 3).

From this description, it will be seen that I have provided a positive means for accurately adjusting the internal brake bands from the outside of the axle housing member by simply loosening the lock nuts 28 and rotating the threaded member 22 a definite number of turns, or parts of turns, so that the brake band on each wheel may be adjusted the same distance. Also the device is designed to be installed in the present constructions by simply inserting the block 14 and forming the ends of the brake bands with the inclined surfaces 26 and 27 for engagement with the surfaces 18 and 19 in the grooves 16 and 17.

An important feature also, is the retaining of the inner ends of the brake bands in place by means of the grooves 16 and 17 whereby they will positively maintain their adjusted positions after the lock nuts 28 are firmly set against the casing 1.

What I claim is:

1. In combination, an axle housing having a threaded opening, a brake drum, brake shoes within the drum having their ends spaced from each other, devices for adjusting the brake shoes from the outside of the axle housing comprising a block member which is inserted between spaced ends, the block member having grooves with inclined bottom surfaces with which the spaced ends of the brake bands engage, a threaded device attached to the block which engages the threaded opening of the axle housing, and extending to the outside of the housing, whereby when the threaded device is operated the bands will be moved outward and their radius increased.

2. In combination, a brake drum, an axle housing having a threaded opening, a brake drum, two brake bands in the drum, the bands being spaced at opposite points, an operating cam being located in one of the spaces, a grooved adjusting block being located in the other space, a part attached to the grooved adjusting block and extending through the threaded opening of the housing for operating the said block from the outside of the axle housing, for moving the brake bands outward, and means for retaining the block and bands in their adjusted positions.

3. In combination, a brake drum, an axle housing having a threaded opening, a brake drum, two brake bands in the drum, the bands being spaced at opposite points, an operating cam being located in one of the spaces, a grooved adjusting block being located in the other space, a part attached to the grooved adjusting block and extending through the threaded opening of the housing for operating the block from the outside of the axle housing, for moving the brake bands outward, and means for retaining the block and bands in their adjusted positions, said block and spaced ends of the bands each having inclined cooperating surfaces, as described.

4. An adjusting device for internal brake bands for motor vehicles comprising a grooved block having inclined surfaces in the grooves, the ends of the brake bands being located in the grooves and in engagement with the inclined surfaces, means attached to said block for moving the same for causing the inclined surfaces to move the brake bands outward, said means being operated from the outside of the enclosing housing of the bands.

5. In an internal brake mechanism, two brake bands each having inclined end surfaces which are spaced from each other, a grooved block with which the inclined ends engage, and means for moving the block for varying the space between the spaced ends of the bands.

6. An adjusting block for brake shoes comprising a grooved member with inclined surfaces at the bottoms of the grooves.

7. In combination, in a brake mechanism, an enclosing axle housing, having a threaded opening, a brake drum, a pair of brake shoes in the drum which are formed with inclined end surfaces, an adjusting device for the shoes comprising a member which is formed with grooves to receive the inclined ends of the shoes, the grooves having inclined surfaces which correspond with the angle of inclination of the end surfaces of the shoes, a part in the threaded opening which is attached to the adjusting device for moving the same axially of the housing for varying the position of the shoes in the drum, and means for operating the part from the outside of the axle housing.

8. In combination, in a brake mechanism, an enclosing axle housing, having an opening, a brake drum, a pair of brake shoes in the drum which are formed with inclined end surfaces, an adjusting device for the shoes comprising a member which is formed with grooves to receive the ends of the shoes, the grooves having inclined surfaces which correspond with the angle of inclination of the end surfaces of the shoes, a part in the opening which is attached to the adjusting device for moving the same axially of the housing for varying the position of the shoes in the drum, and means for operating the part from the outside of the axle housing.

MOSES LA LONDE.